United States Patent
Greene

(10) Patent No.: US 6,259,770 B1
(45) Date of Patent: Jul. 10, 2001

(54) DPNSS VRU WITH SINGLE CHANNEL TRANSFER

(75) Inventor: Daniel L. Greene, Aurora, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 08/956,832

(22) Filed: Oct. 23, 1997

(51) Int. Cl.[7] .................................................. H04M 1/64
(52) U.S. Cl. ........................ 379/67.1; 379/266; 379/309
(58) Field of Search .................................. 379/265–266, 379/309, 210–212, 202, 82, 88.18

(56) References Cited

U.S. PATENT DOCUMENTS

| | | | |
|---|---|---|---|
| 5,046,088 | * | 9/1991 | Margulies ............................ 379/211 |
| 5,185,782 | * | 2/1993 | Srinivasan ............................. 379/67 |
| 5,432,845 | * | 7/1995 | Burd et al. ........................... 379/210 |
| 5,444,774 | * | 8/1995 | Friedes ................................ 379/266 |
| 5,526,416 | * | 6/1996 | Dezonno et al. .................... 379/265 |
| 5,740,240 | * | 4/1998 | Jolissaint ............................. 379/265 |

* cited by examiner

*Primary Examiner*—Duc Nguyen
(74) *Attorney, Agent, or Firm*—Welsh & Katz, Ltd.

(57) ABSTRACT

A method and apparatus are provided for transferring a call on a call channel of a voice response unit of an automatic call distributor to a call destination. The method includes the steps of transferring a request for placing the call on hold to a switch controller of the automatic call distributor over a signalling channel associated with the call channel and transferring an identifier of the call destination over the call channel to the switch controller. The method further includes the step of connecting the call to the call destination.

12 Claims, 5 Drawing Sheets

DPNSS VRU WITH SINGLE CHANNEL TRANSFER

FIELD OF THE INVENTION

The invention relates to telephony devices and more particularly to automatic call distributors.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution (ACD) system distributes the call among its call handling resources based upon some algorithm, typically based upon availability. For example, a first call handling resource presented to a caller by the ACD may be a voice response unit (VRU) providing a prerecorded message asking the caller to wait for the first available agent. Other call handling resources may be sales agents with expertise in answering certain types of questions.

Where all agents are consider equal, the ACD may distribute the calls based upon which agent position (telephone) has been idle the longest. When all agents are preoccupied with calls, new calls may be routed to other VRUs which may be used to offer other call destination options (e.g., voice mail, telephone numbers of other service personnel, etc.). Alternatively, a VRU may be used to elicit information from a caller as a means of determining a call destination.

In order to distribute incoming calls from the PSTN to the available agents, the interaction of a controlling ACD computer with a switching fabric of the ACD system becomes essential. Often a connection to a local PSTN is in the form of a number of trunk connections. Each of the trunk connections is monitored by the ACD controller for incoming calls. Where a call is detected, the controller searches for and selects an idle agent or VRU. The ACD controller identifies such call resources from a resource table within a memory of the ACD controller. Such table may contain a list of ACD switch ports to which the call resources (e.g., agents, VCUs, etc.) are connected. Upon determining a destination, the controller instructs the switch to form a connection between the incoming trunk and destination port.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

In still other systems, a VRU may be used to request a customer identifier from the customer. The identifier may, in turn, be transferred to the host. The host may use the identifier not only retrieve customer records, but also to determine a final call destination. Where the host is used to determine a call destination, an identifier of the call destination would be transferred to the ACD controller over a data interconnect between the host and ACD. The ACD controller, in turn, would instruct the ACD switch to route the call to the specified destination.

Where ANI is used, the controller of the ACD receives the ANI digits from the PSTN (identifying the caller via the caller's telephone number) at the same time the call arrives from the PSTN. Upon selecting an agent, the controller may transfer a call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

Where a call is placed in a queue, the ACD controller may monitor a total time that the call has been in the queue. Where the total time exceeds a threshold, the controller may connect a VRU to the call and present a number of other options to the caller, including leaving a call-back number or transfer to another facility. Where the call is to be transferred, a message must be transferred from the VRU to a switch of the ACD instructing the ACD as to a call destination.

While the existing method of distributing calls is relatively satisfactory, it is dependent upon an ability on the VRU to transfer call destination information to the ACD. Where a VRU is implemented as an application on the host processor, a call transfer may include a transfer of call destination information from the host processor to a controller of the ACD and then to the switch of the ACD. Because of the cost in computer time associated with data transfers between controllers, a need exists for a means of providing call transfers directly from the VRU to the switch of the ACD.

SUMMARY

A method and apparatus are provided for transferring a call on a call channel of a voice response unit of an automatic call distributor to a call destination. The method includes the steps of transferring a request for placing the call on hold to a switch controller of the automatic call distributor over a signalling channel associated with the call channel and transferring an identifier of the call destination over the call channel to the switch controller. The method further includes the step of connecting the call to the call destination.

DETAILED DESCRIPTION OF AN EMBODIMENT

Figure 1:
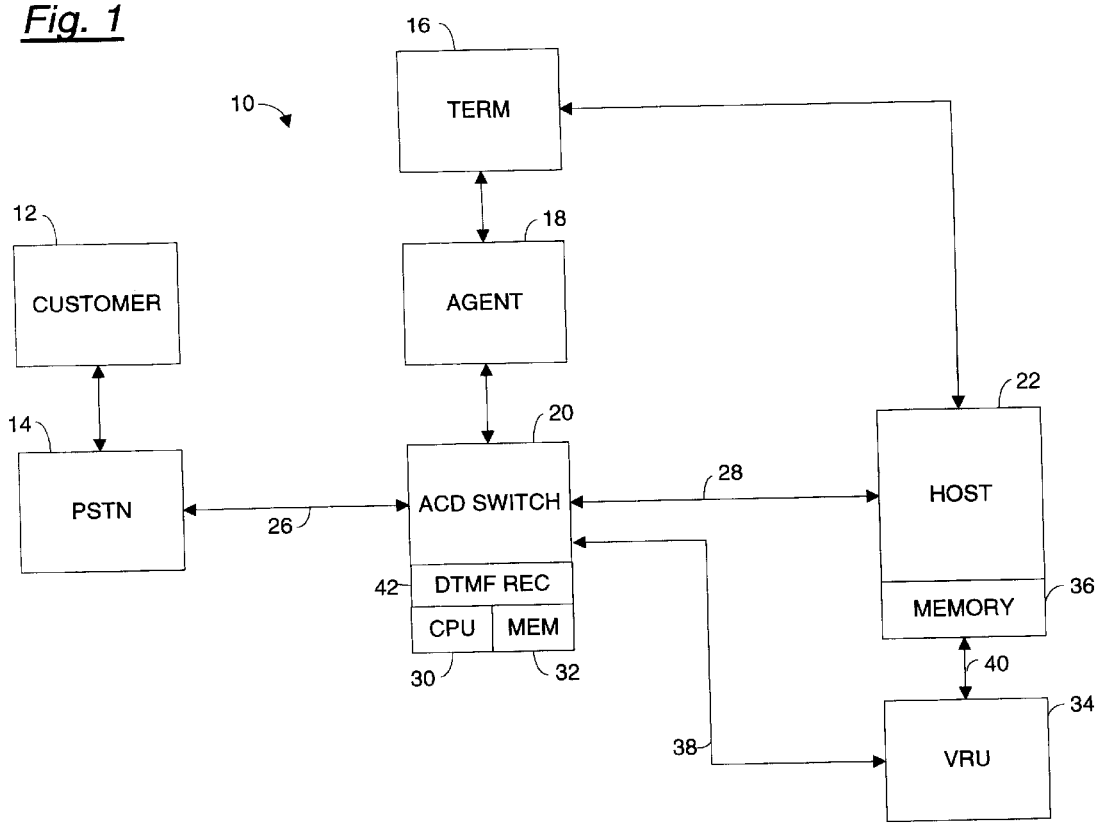
FIG. 1 is a block diagram of an automatic call distribution system in accordance with an embodiment of the invention.

FIG. 1 is a block diagram of an example of an ACD system 10 incorporating the VRU single channel transfer capability, generally, in accordance with an embodiment of the invention. The ACD system 10 may, for example, be any commercially available ACD (e.g., a Spectrum Call Distribution System made by Rockwell International).

Under the embodiment, an ACD switch 20 is connected to a host database computer 22 and PSTN 14. The ACD switch 20 may be interconnected with the host 22 through an appropriate data link 28 (e.g., leased lines, virtual private lines, microwave link, etc.).

The host 22 may also be interconnected with an agent terminal 16 associated with the agent and agent telephone 18. The host 22 functions as a repository of customer records which may be displayed for the benefit of the agent upon the agent terminal 16 during conversations with the customer 12.

The host 22 may also include one or more associated voice response units (VRUs) 34. The VRU 34 may be implemented as an application within the host 22 or as a separate processing utility interconnected with the host 22 (as shown in FIG. 1). Each VRU 34 may be connected to one or more ports of the switch 20 through an E1 or T1 interface provided through the interconnect 38.

The individual voice channels of the interconnect 38 may be implemented under an ISDN primary rate interface (PRI). The protocols supported by the interface 38 may include Q9.21/Q9.31, Digital Access Signalling System No. 1 (DASS2) or Digital Private Network Signalling System (DPNSS).

The ACD switch 20 may be connected to the PSTN 14 through a number of trunk lines 26. The PSTN 14 may offer telephone service to the ACD system 10 through the trunked lines 26 including services such as ANI and DNIS.

With regard to inbound calls, the ACD switch 20 functions to selectively interconnect calls from external customer units 12 to agents 18, or, alternatively, to VRUs 34. While the agent 18 is shown in terms of a single entity, it may be assumed that the agent position 18 may be one of many agents.

The ACD switch 20, in the illustrated embodiment, is controlled by a central processing unit, or CPU, 30, in conjunction with peripheral memory devices 32. Control of the switch 20 and communications with the host 22 and PSTN 14 may be accomplished generally as described in U.S. Pat. No. 5,268,903, and U.S. Pat. No. 5,140,611, both to Jones, and both incorporated herein by reference. Routing of calls to VRUs 34, agents 18 and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

During operation, the CPU 30 monitors each port of the switch 20 for changes in status. A change in status may be an agent unit 18 going off-hook to make a call, an agent unit 18 or VRU 34 hanging up after a call, or it may be a call alerting tone detected on a trunk 26 alerting the CPU 30 to the presence of an incoming call.

Where the status change is an agent 18 or VRU 34 hanging up, the CPU 30 acts to tear-down the call connection within the switch 20 between the agent or VRU at a first port of the switch and a second party to the conversation communicating through a second port of the switch 20. Upon tear down of the connection, the CPU 30 also sends a message to the host, notifying the host of termination of the call connection. The message to the host 22 would include at least the identity of the agent 18 or VRU 34.

Where the status change is a call alert signal on an incoming trunk line (or control channel associated with the incoming trunk line), then the CPU 30 may send an acknowledge message to the PSTN 14 accepting the call. The PSTN 14 may respond with the forwarding of DNIS and ANI messages, identifying the called and calling party.

Upon accepting the call, the CPU 30 first stores the DNIS and ANI numbers in a termination table of the memory 32. More specifically, the CPU 30C maintains a table of call information for each port of the switch 20. Where a call is accepted on an incoming trunk line, the CPU 20 enters the DNIS and ANI number into the table for the incoming trunk line upon which the call is received.

In addition to updating the termination table within memory 32, the CPU 20 also generates a call identifier (also sometimes referred to as a call ID or sequence number) for the call, unique to the switch 20. The call identifier along with the ANI and DNIS numbers may then be sent to the host 22 as part of a call arrival message. Delivery of the ANI and DNIS numbers and call identifier allows the host 22 to create a unique call record for the call in memory 36, in a call record area of memory 36 reserved for the switch 20. The call record may be used to retrieve customer records for delivery to an appropriate display terminal 16 once the call has been assigned to an agent 18.

The CPU 20 then, by reference to the DNIS number, determines the identity of agent 18 or VRU 34 to which the call is to be directed. For example, the DNIS number may be used to differentiate between calls directed to a first telephone number arriving on a first incoming trunk group directed to a sales group of the organization from calls directed to a service group of the organization. Since agents servicing sales calls would, in most cases, not handle calls directed to service, the DNIS number provides a convenient means of differentiating between two or more types of calls.

Upon determining the identity of the agent 18 (or group of agents) or VRU 34, the CPU 30 instructs the switch 20 to internally connect the port of the incoming trunk to a port of one of the identified agents or VRU.

Where the call has been connected to an agent or VRU, the CPU 30 stores the port number of the identified agent in the termination table for the port of the incoming trunk. Likewise, the CPU 30 stores the port identifier of the incoming trunk in the termination table of the identified agent or VRU.

To complete set-up of the call to the identified agent, the CPU 30 sends a call completion message to the host 22. The call completion message includes at least a port identifier of the identified agent or VRU and the call identifier. The information of the call completion message is stored in the call record previously created in conjunction with arrival of the call arrival message. The port identifier and call identifier allows the host 22 to deliver customer data to the specific display terminal 16 of the agent 18 to which the call was delivered.

Where the call set-up was to a VRU 34 the call completion message allows the host 22 to initiate an appropriate voice message through the VRU 34. For instance, the DNIS message previously entered into the call file may allow the host 22 to identify the call as being delivered to a sales number and, therefore, initiate an appropriate greeting for a sales call.

The VRU 34 may also present a verbal menu to the caller of a set of options for additional service. The VRU 34 may then monitor the connection with the caller, either for a verbal response or for one or more dual-tone multifrequency (DTMF) digits provided by activation of the touch-tone buttons on the callers telephone. The response may be for a specific agent 18 serviced through the ACD 10 or for another group of agents providing service through another ACD (not shown).

Figure 2:
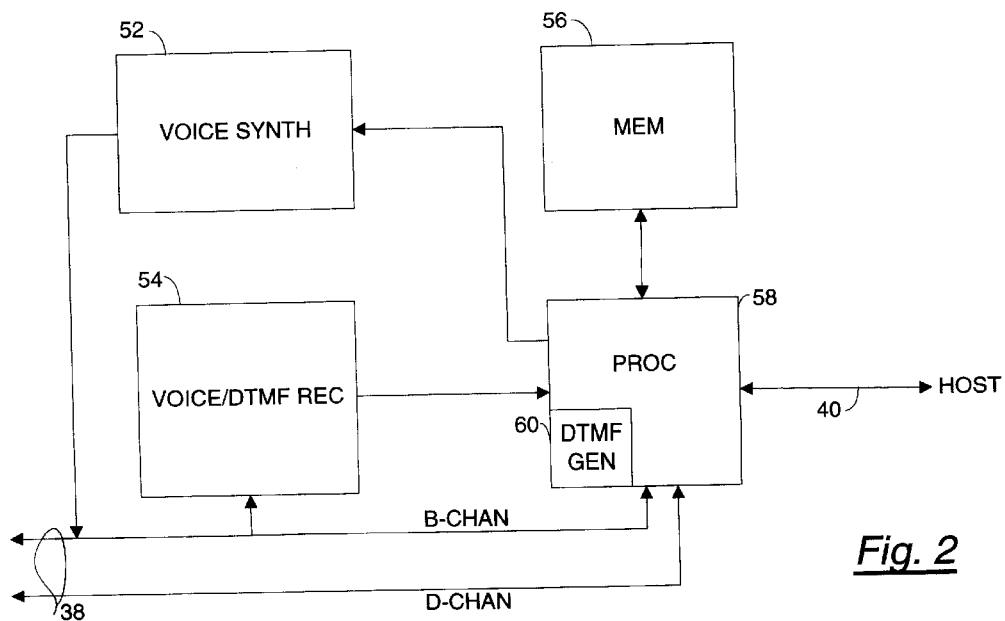
FIG. 2 is a block diagram of one embodiment of a voice response unit of the automatic call distributor of FIG. 1.

FIG. 2 depicts a block diagram of an example of the VRU 34. As shown, the VRU 34 includes a voice synthesizer 52, a voice/DTMF recognition circuit 54, a processor 58 and memory 56. The voice synthesizer 52 functions under the control of the processor 58 to deliver a voice message to a caller through a telephone connection between the caller and the VRU 34 through a B-channel of the interconnect 38. Similarly, the voice/DTMF recognition circuit 54 functions to recognize a response to the caller and to deliver the response to the processor 58. The memory 56 may be used to store a number of digitized voice responses that may be delivered through the voice synthesizer 52. The memory 56 may also be used to store a number of call transfer destinations.

The VRU 34 may operate autonomously or slaved to the host processor 22. Where the VRU is slaved to the host 22, the host 22 recognizes call delivery to the VRU 34 based upon the call completion record delivered to the host 22 from the ACD. Based upon the DNIS and ANI information, the host 22 would select an appropriate voice message for delivery to the caller 12. A digitized copy of the voice message, in turn, be transferred to the VRU 34 from the host 22, or the host may simply transfer an identifier of the message previously stored in memory 56.

In the autonomous mode, the ACD 10 may transfer a call delivery massage to the VRU 34 along with the call. The call delivery message may be delivered by a digital signal transmitter (e.g., driver circuits of the processor 55) over the D-channel of the interconnect 38 and may include DNIS and ANI information. Based upon the call delivery message, the processor 58 may select an appropriate voice message from memory 56 and cause such message to be presented to the caller through the voice synthesizer 52.

Following delivery of the voice message, the VRU 34 may wait for a response. The response may be DTMF tones delivered from the touch-tone buttons of the caller or a spoken response recognized by the voice/DTMF recognition circuit 54. The response may lead to the presentation of another voice message to the caller through the voice synthesizer 52 and period for response or transfer of the call to a selected call destination.

Under the embodiment, the VRU may function to transfer the call to a destination through a set of instructions transferred to the switch 20 through the interconnect 38. Transfer of the call under the embodiment is accomplished by a combination of inband and out-of-band signalling.

For example, the VRU 34 first sends an end-to-end (EEM) message over the D-channel of the interconnect 38 requesting that the call be put on hold (e.g., a HOLD-REQ message). In response, the CPU 30 may accept or reject the request. The CPU 30 may reject the request where the switch 20 does not have any free lines to accomplish a transfer. The CPU 30 may indicate its rejection of the request by returning a reject message (REJ) over the D-channel rejecting the request.

Where the CPU accepts the request, the CPU 30 places the call on hold and connects a DTMF receiver 42 to the B-channel of the interconnect 38 with the VRU 34. The CPU 30 may also send an EEM message to the processor 58 of the VRU 58 containing an acknowledgment (ACK) message.

Upon receipt of the ACK message, the processor 58 retrieves a telephone number of the selected destination from memory 56, converts the message to a set of DTMF tones in a modem (e.g., DTMF generator) 60 and transmits the tones to the DTMF receiver 42 in the switch 20. The switch, upon receiving the DTMF tones, converts the tones to a set of call digits and initiates a call placement routine using the call digits.

For instance, the CPU 30 by reference to a lookup table may first determine whether the call is directed to an inside party (e.g., an agent 18) connected to the switch 20 or to an outside party served through the PSTN 14. Where the call is directed to an inside party, the switch 20 may initiate a call alert sequence through a port of the switch 20 connected to the selected destination. When the call is answered, a connect tone (CTONE) and logical workstation number (LWN) or agent directory number (DN) may be returned to the processor 58.

Where the call is directed to an outside party, the CPU 30 may first determine a call routing, again, by reference to a lookup table. Upon determining a call routing, the CPU 30 may seize port connected to an outgoing trunk line 26 and transfer the call digits to the PSTN 14. Upon call connection, a CTONE may be returned to the processor 58.

After transmitting the call digits to the switch 20, the VRU 34 may wait for the CTONE, or disconnect. Where the VRU 34 wants to disconnect, the VRU 34 transfers a clear request message (CRM) over the D-channel of the interconnect 38 to the switch 20. Upon receipt of the CRM, the CPU 30 instructs the switch 20 to form a connection between the inbound port of the calling party and the outbound port chosen to access the selected destination. The CPU 30 also sends a clear indication message (CIM) to the processor 58 over the D-channel of the interconnect 38 indicating that the call has been cleared.

Upon completing the call transfer, the VRU 34 sends a call transfer message notifying the host 22 of the transfer. The message includes at least an identification of the VRU 34 and an identifier of the call destination.

Instead of terminating its connection immediately after transmitting the called digits, the processor 58 (functioning as a call completion processor) of the VRU 34 may also wait for call completion. Waiting for call completion to the selected destination avoids the possibility of the caller being cut-off in the event that the call cannot be completed for any reason.

Figure 3:
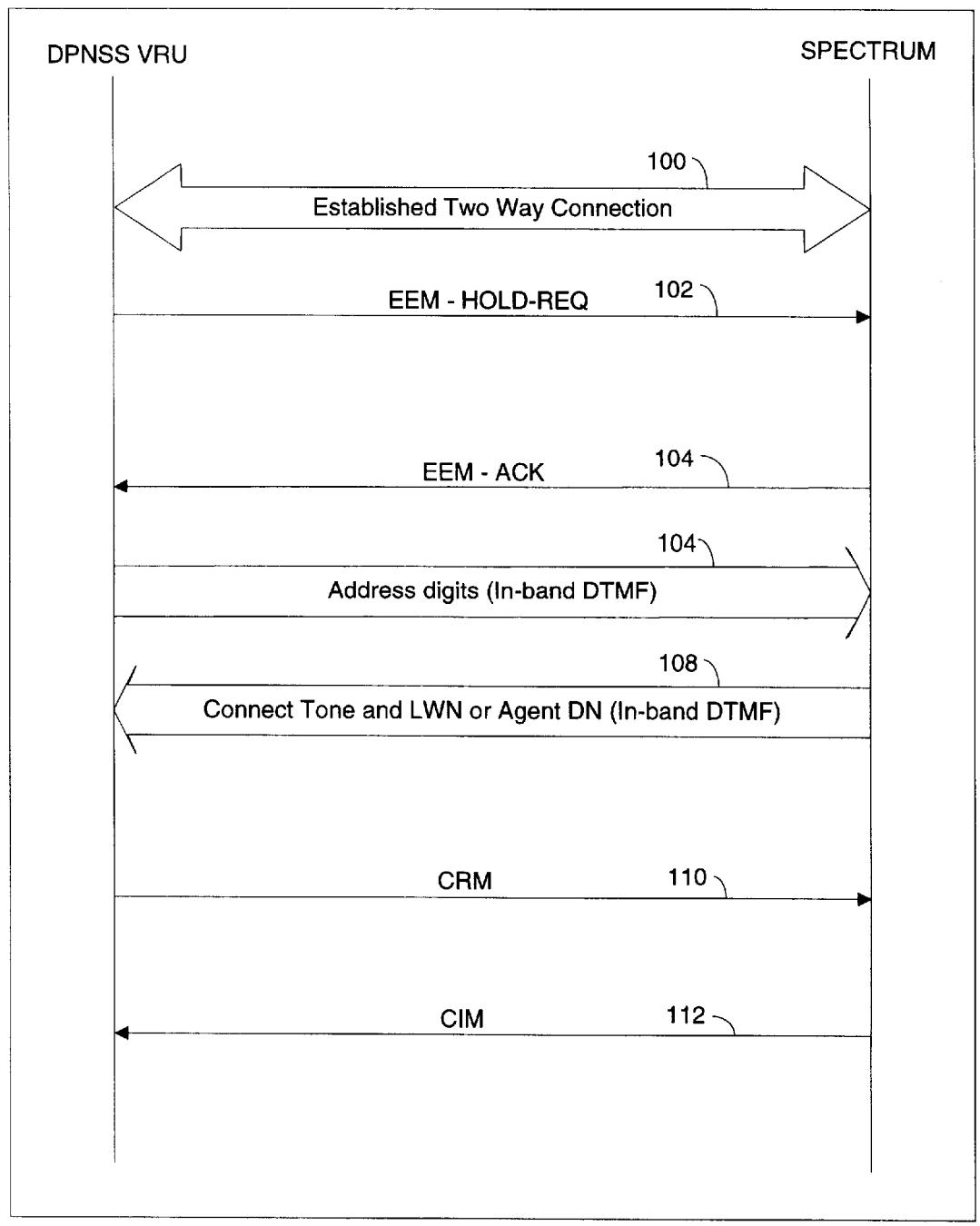
FIG. 3 is a message flow diagram between the voice response unit and switch of FIG. 1 under a first call transfer scenario.

FIG. 3 shows a signal flow diagram of an example of signalling between the VRU 34 and switch 20 for the case where the VRU 34 monitors for call completion. As above, a two-way connection is established 100 between the caller 12 and the VRU 34. After determining a selected call destination, the VRU 34 transmits a HOLD-REQ 102 over the D-channel to the switch 20. The switch 20 returns an ACK 104 to the processor 58 and the processor 58 sends 104 a set of destination digits to the switch 20. In this case the VRU 34 waits for call completion before terminating the connection.

When the VRU 34 detects a CTONE 108, the VRU 34 sends a CRM 110 to the switch 20. Upon detecting the CRM, the switch re-routes the call through the switch 20 and sends a CIM 112 to the VRU 34.

Figure 4:
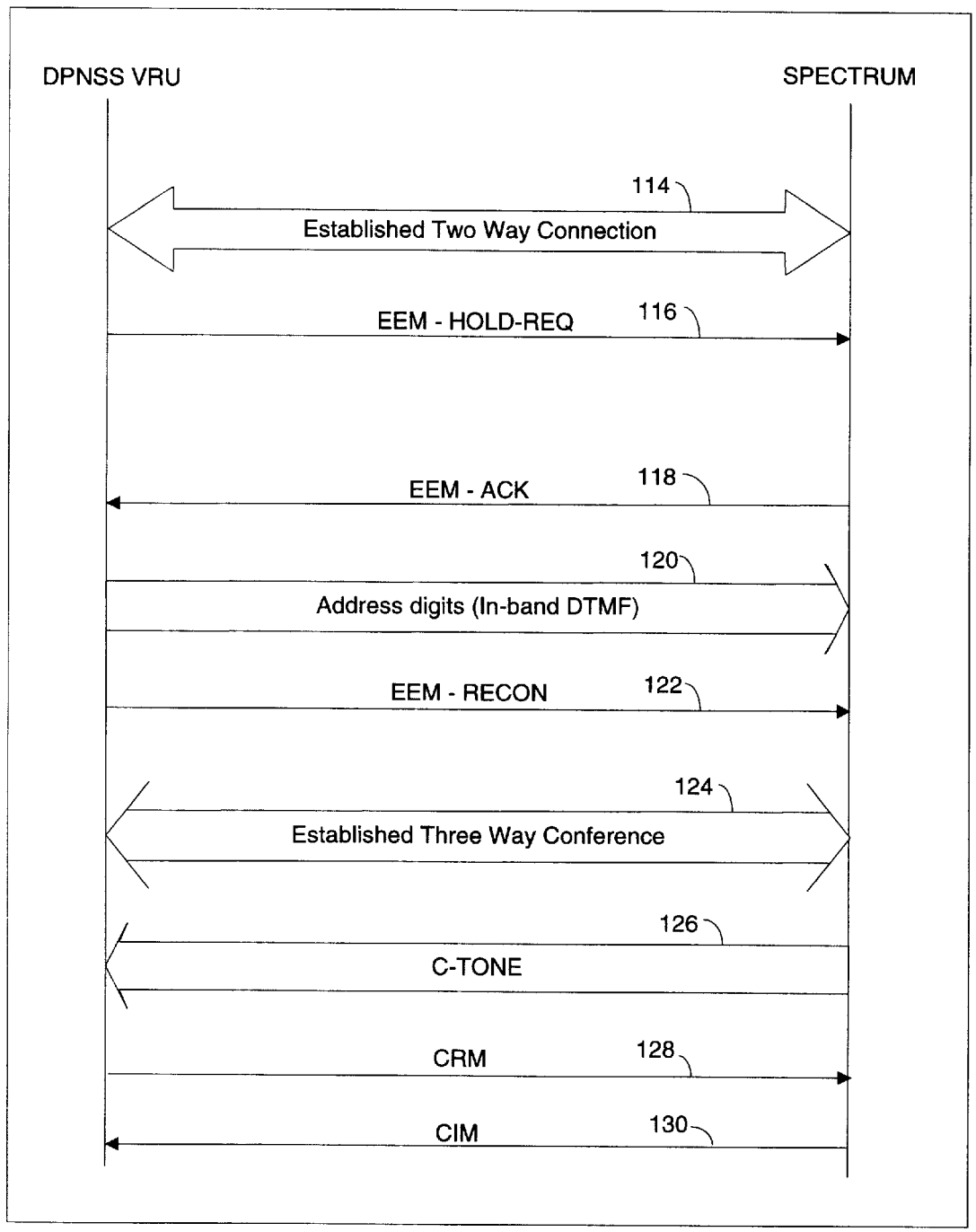
FIG. 4 is a message flow diagram between the voice response unit and switch of FIG. 1 under a second call transfer scenario.

In another case, the VRU 34 may choose to reconnect the calling party into a three-party connection before the VRU 34 terminates its participation. Under this scenario (FIG. 4), a connection is established 114 between the VRU 34 and caller 12 and the VRU 34 transfers 116 a HOLD-REQ to the switch 20. The switch 20 sends 118 an ACK and the VRU 34 transfers 120 a set of destination digits.

Following transmission of the destination digits, the VRU 34 reconnects the calling party 12 by sending 120 a reconnect message (RECON) to the switch 20 over the D-channel. Upon receiving a RECON message, conferencing facilities of the switch may form a three party connection between the incoming port from the caller 12, the VRU port of the interconnect 38 and the selected port of the call destination.

The VRU 34 may then wait for the CTONE. Upon detecting the CTONE 126, the VRU 34 may send 128 a disconnect message. The switch upon receiving 130 the CIM message, disconnects the VRU 34 from the three party connection.

Figure 5:
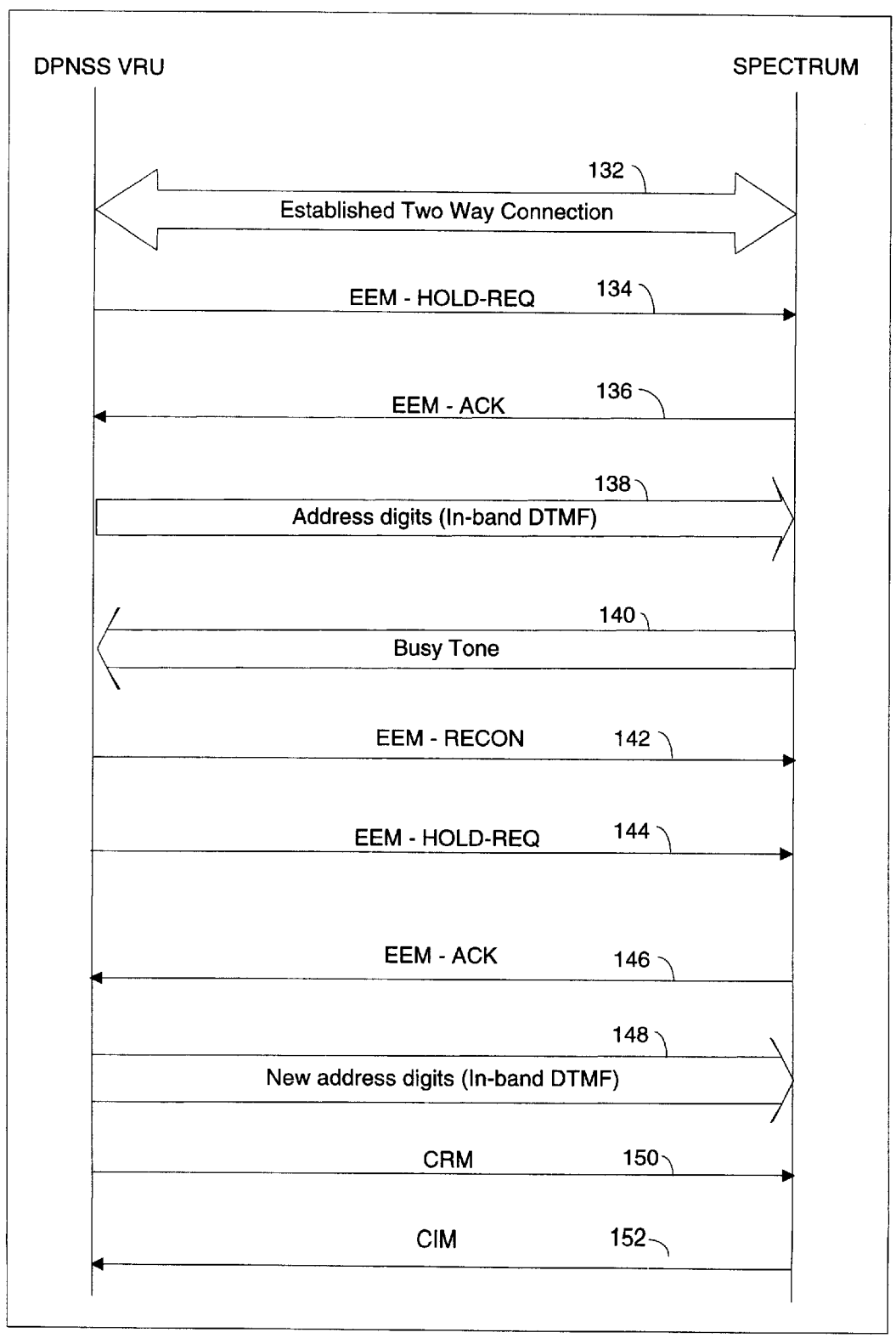
FIG. 5 is a message flow diagram between the voice response unit and switch of FIG. 1 under a third call transfer scenario.

In another scenario, the destination phone may be busy and the call may need to be directed to another location. In such a case (FIG. 5), the two-way connection 132, hold request 134, acknowledgment 136 and sending call destination digits 138 proceeds as above. In this case a busy tone 140 is now detected. The processor 58 (functioning as a reconnect processor) of the VRU 34 responds by now sending a reconnect message 142 over the D-channel to the switch 20, followed by another hold request 144. The transmission of a RECON, followed by a HOLD-REQ causes the switch to drop the outbound port to the previously selected destination and to place the caller 12 on hold. The switch 20 also sends an acknowledgment 146 over the D-channel to the VRU 34.

Upon receiving the acknowledgment 146, the processor 58 (functioning as an alternate destination processor) of the VRU 34 is now free to send another set of call destination digits in-band over the B-channel of the interconnect 38 to the switch 20. The other set of call destination digits may be a repeat of previously transmitted digits or they may be an alternate call destination retrieved from the call destination lookup table.

Upon retrieving another set of call destination digits, the VRU 34 transfers 148 the digits to the switch 20. The VRU 34 may now wait for a CTONE as described above or send a disconnect message 150. The switch 20 may disconnect and return a call cleared message 152.

Figure 6:
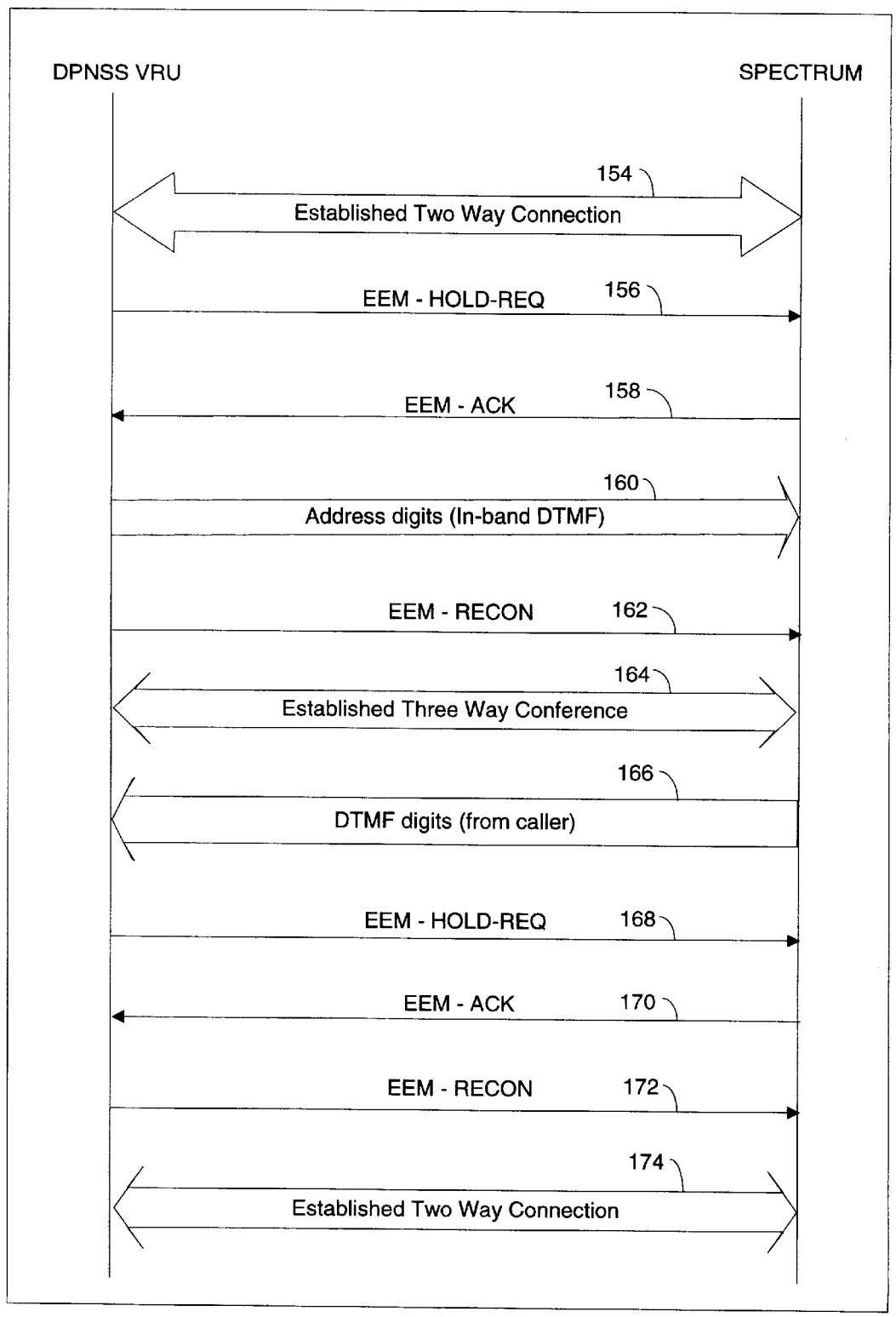
FIG. 6 is a message flow diagram between the voice response unit and switch of FIG. 1 under a fourth call transfer scenario.

In another scenario (FIG. 6), the caller 12 may change his mind about his menu selection before completion of the call transfer. Under the embodiment, provisions are made to accept an identifier of a new destination during set up of the first call transfer.

Under the scenario, the VRU 34 receives the connection 154, does a hold request 156 and receives an acknowledgment 158. The VRU 34 transfers the first destination address digits 160, followed by a request for a three party connection 162. The switch 20 establishes the three party connection 164.

Where the VRU 34 now detects another set of DTMF digits from the caller 166, the VRU 34 takes steps to abort the call transfer. In this case, the VRU 34 transfer a hold request 168 over the D-channel to the switch 20. The switch 20 returns an acknowledgment 170 over the D-channel. The VRU 34 then sends a reconnect message 172 to the switch 20. The HOLD-REQ followed by the RECON causes the switch 20 to abort the call transfer and reconnect the caller 12 to the VRU 34.

Upon aborting the call, the VRU 34 may again present the caller 12 with a set of menu options. Alternately, the VRU 34 may act upon the digits received before aborting the call to route the caller to the destination requested 166 just before the call was aborted.

Specific embodiment of methods and apparatus of transferring calls from a VRU to a third party according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of transferring a call on a call channel of a voice response unit of an automatic call distributor to a call destination, such method comprising the steps of:

transferring a request for placing the call on hold to a switch controller of the automatic call distributor over a signalling channel associated with the call channel;

transferring an identifier of the call destination over the call channel to the switch controller;

connecting the call to the call destination;

waiting for a connect tone after transferring the identifier of the call destination, measuring a time duration after transfer of the identifier of the call destination and comparing the time duration with a threshold value;

transferring a reconnect message followed by a hold message from the automatic call distributor to the switch controller over the signalling channel when the time duration exceeds the threshold value; and transferring an identifier of a second call destination to the switch controller.

2. The method as in claim 1 wherein the step of transferring the request for placing the call on hold further comprises returning a hold acknowledgment from the switch controller of the automatic call distributor over the signalling channel.

3. The method as in claim 1 further comprising connecting the call to the second call destination.

4. A method of transferring a call on a call channel of a voice response unit of an automatic call distributor to a call destination, such method comprising the steps of:

transferring a request for placing the call on hold to a switch controller of the automatic call distributor over a signalling channel associated with the call channel;

transferring an identifier of the call destination over the call channel to the switch controller;

connecting the call to the call destination, forming a three-party connection among the call, the voice response unit and a connection to the call destination; and waiting for a connect tone after forming the three party connection. detecting a busy signal and transmitting a hold request to the switch controller in response to the busy signal;

wherein the step of transmitting a hold request further comprises transmitting an identifier of a second call destination over the call channel.

5. Apparatus for transferring a call on a call channel of a voice response unit of an automatic call distributor to a call destination, such apparatus comprising:

means for transferring a request for placing the call on hold to a switch controller of the automatic call distributor over a signalling channel associated with the call channel;

means for transferring an identifier of the call destination over the call channel to the switch controller;

means for connecting the call to the call destination;

means for waiting for a connect tone after transferring the identifier of the call destination, means for measuring a time duration after transfer of the identifier of the call destination and means for comparing the time duration with a threshold value;

means for transferring a reconnect message followed by a hold message from the automatic call distributor to the switch controller over the signalling channel when the time duration exceeds the threshold value; and means for transferring an identifier of a second call destination to the switch controller.

6. The apparatus as in claim 5 wherein the means for transferring the request for placing the call on hold further comprises means for returning a hold acknowledgment from the switch controller of the automatic call distributor over the signalling channel.

7. The apparatus as in claim 5 further comprising means for connecting the call to the second call destination.

8. Apparatus for transferring a call on a call channel of a voice response unit of an automatic call distributor to a call destination, such apparatus comprising:

means for transferring a request for placing the call on hold to a switch controller of the automatic call distributor over a signalling channel associated with the call channel;

means for transferring an identifier of the call destination over the call channel to the switch controller;

means for connecting the call to the call destination, further comprising means for forming a three-party connection among the call, the voice response unit and a connection to the call destination; and means for waiting for a connect tone after forming the three party connection, means for detecting a busy signal and means for transmitting a hold request to the swtich controller in response to the busy signal;

wherein the means for transmitting a hold request further comprises means for transmitting an identifier of a second call destination over the call channel.

9. Apparatus for transferring a call on a call channel of a voice response unit of an automatic call distributor to a call destination, such apparatus comprising:

a digital signal transmitter which transfers a request for placing the call on hold to a switch controller of the automatic call distributor over a signalling channel associated with the call channel;

a modem which transfers an identifier of the call destination over the call channel to the switch controller;

a telephone switch which connects the call to the call destination;

a timer which measures a time duration after transfer of the identifier of the call destination and a comparator which compares the time duration with a threshold value;

a reconnect processor which transfers a reconnect message followed by a hold message from the automatic call distributor to the switch controller over the signalling channel when the time duration exceeds the threshold value; and a memory which supplies an identifier of a second call destination to the switch controller.

10. The apparatus as in claim 9 wherein the digital signal transmitter which transfers the request for placing the call on hold further comprises a switch digital transmitter which returns a hold acknowledgment from the switch controller of the automatic call distributor over the signalling channel.

11. The apparatus as in claim 9 further comprising an alternate destination processor coupled to the memory which functions to connect the call to the second call destination through the switch controller.

12. Apparatus for transferring a call on a call channel of a voice response unit of an automatic call distributor to a call destination, such apparatus comprising:

a digital signal transmitter which transfers a request for placing the call on hold to a switch controller of the automatic call distributor over a signalling channel associated with the call channel;

a modem which transfers an identifier of the call destination over the call channel to the switch controller;

a telephonic switch which connects the call to the call destination, further comprising a switch conference facility of the telephonic switch which forms a three-party connection among the call, the voice response unit and a connection to the call destination; and a call completion processor which waits for a connect tone after forming the three party connection, detects a busy signal and transmits a hold request to the switch controller in response to the busy signal;

wherein the call completion processor which transmits a hold request further comprises a memory which supplies an identifier of a second call destination to the call completion processor for transmission over the call channel.

* * * * *

UNITED STATES PATENT AND TRADEMARK OFFICE
CERTIFICATE OF CORRECTION

PATENT NO. : 6,259,770 B1
DATED : July 10, 2001
INVENTOR(S) : Daniel L. Greene

It is certified that error appears in the above-identified patent and that said Letters Patent is hereby corrected as shown below:

<u>Title page,</u>
"References Cited" should include -- U.S. Patent No. 5,544,232 8/1996 Baker et al. --

Signed and Sealed this

Twenty-ninth Day of January, 2002

Attest:

JAMES E. ROGAN
*Attesting Officer*        *Director of the United States Patent and Trademark Office*